United States Patent [19]
Wang

[11] Patent Number: 5,563,891
[45] Date of Patent: Oct. 8, 1996

[54] WAITING TIME JITTER REDUCTION BY SYNCHRONIZER STUFFING THRESHOLD MODULATION

[75] Inventor: Bor-Min Wang, Taichung, Taiwan

[73] Assignee: Industrial Technology Research Institute, Chutung, Taiwan

[21] Appl. No.: 524,138

[22] Filed: Sep. 5, 1995

[51] Int. Cl.[6] .............................. H04J 3/07; H04L 7/033
[52] U.S. Cl. ...................... 370/102; 370/105.3; 370/112; 375/372; 375/376
[58] Field of Search .................................. 370/102, 105.2, 370/105.3, 107, 112; 375/362, 363, 371, 372, 373, 376

[56] References Cited

U.S. PATENT DOCUMENTS

| | | | |
|---|---|---|---|
| 4,397,017 | 8/1983 | Rokugo | 370/102 |
| 5,067,126 | 11/1991 | Moore | 370/112 |
| 5,263,057 | 11/1993 | Nawrocki et al. | 370/102 |
| 5,337,315 | 8/1994 | Ehrlich | 370/102 |
| 5,459,782 | 10/1995 | Volejnik | 375/372 |

OTHER PUBLICATIONS

J. Bellamy, Digital Telephony, ch. 7, pp. 333–360 (1991).
G. Pierbon & R. Valussi, *Jitter Analysis of a Double Modulated Threshold Pulse Stuffing Synchronizer*, IEEE Trans. Comm., vol. 39, No. 4, pp. 594–602, Apr., 1991.
D. Duttweiler, *Waiting Time Jitter*, Bell Sys. Tech. J., vol. 51, pp. 165–207, Jan., 1972.
W. Grover, T. Moore & J. McEachern, *Waiting Time Jitter Reduction by Synchronizer Stuff Threshold Modulation*, Proc. of GLOBECOMM, pp. 13.7.1–13.7.5 (1987).

Primary Examiner—Hassan Kizou
Attorney, Agent, or Firm—Meltzer, Lippe, Goldstein, et al.

[57] ABSTRACT

A system and method are disclosed for reducing waiting time jitter in a pulse-stuffing multiplexer of a communications network. The data of a lower rate signal, that is plesiochronous with a higher rate signal into which the lower rate signal is to be multiplexed, is written into an elastic buffer in accordance with a write signal that is derived from the data of the lower rate signal. The data is read out of the elastic buffer in accordance with a read signal which is locally generated. A comparison circuit forms the phase difference between the write and read signals. A justification circuit generates a justification signal with pulses corresponding to the instances where the phase difference exceeds a dynamically randomly varying threshold. The pulses of the justification signal, in turn, regulate the reading out of the data of the lower rate signal from the elastic buffer.

20 Claims, 12 Drawing Sheets

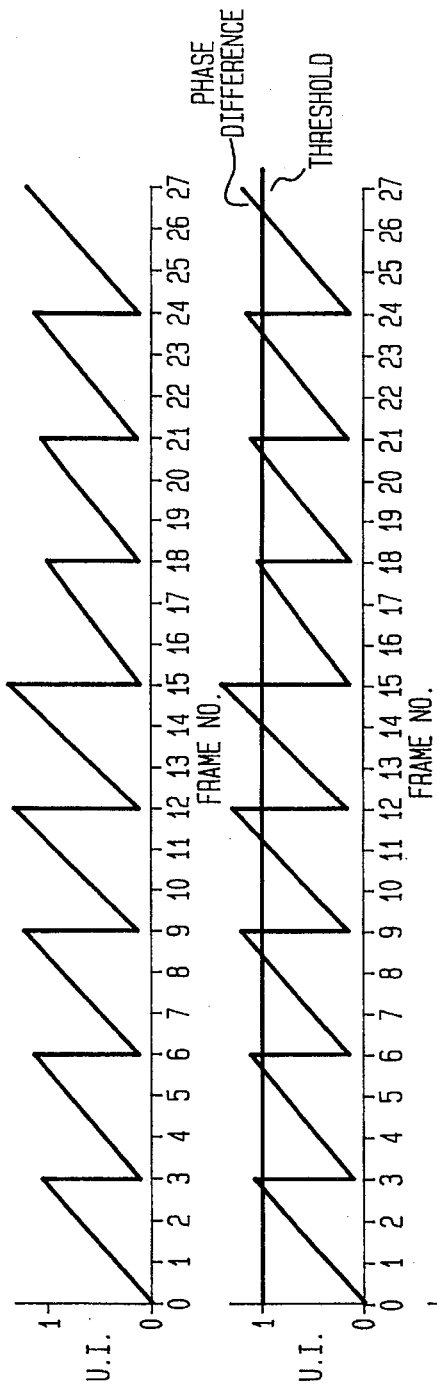
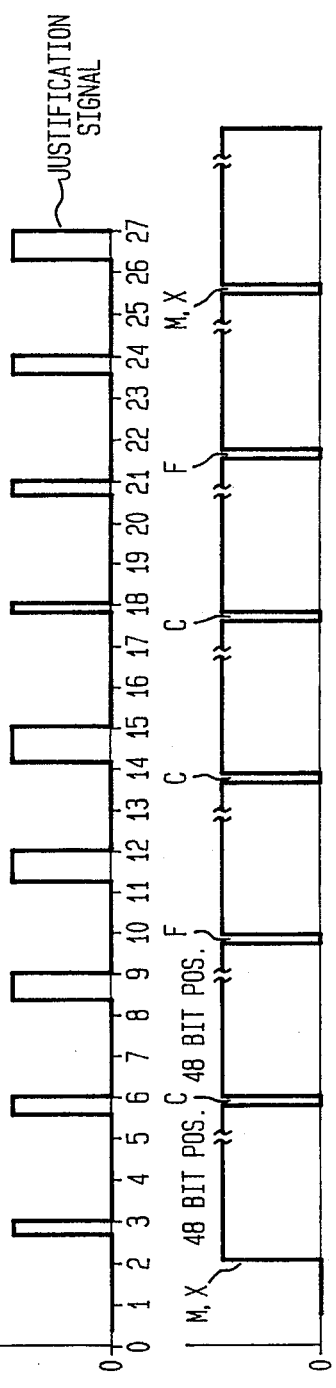
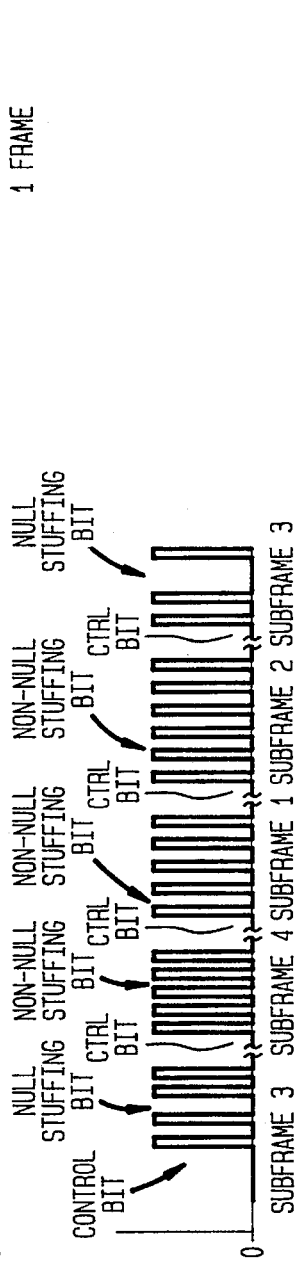
FIG. 4A (PRIOR ART)
FIG. 4B (PRIOR ART)
FIG. 4C (PRIOR ART)
FIG. 4D (PRIOR ART)
FIG. 4E (PRIOR ART)

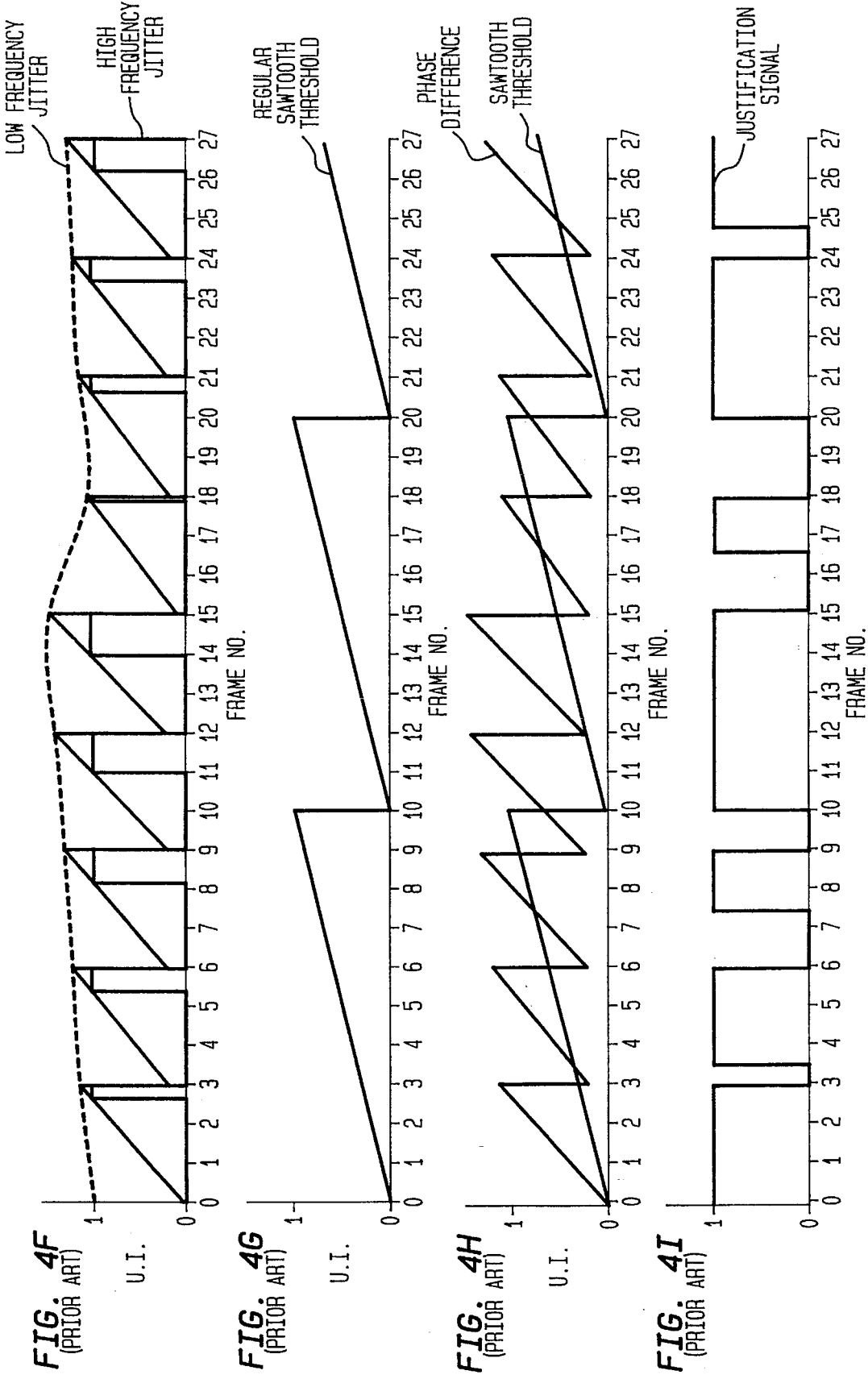

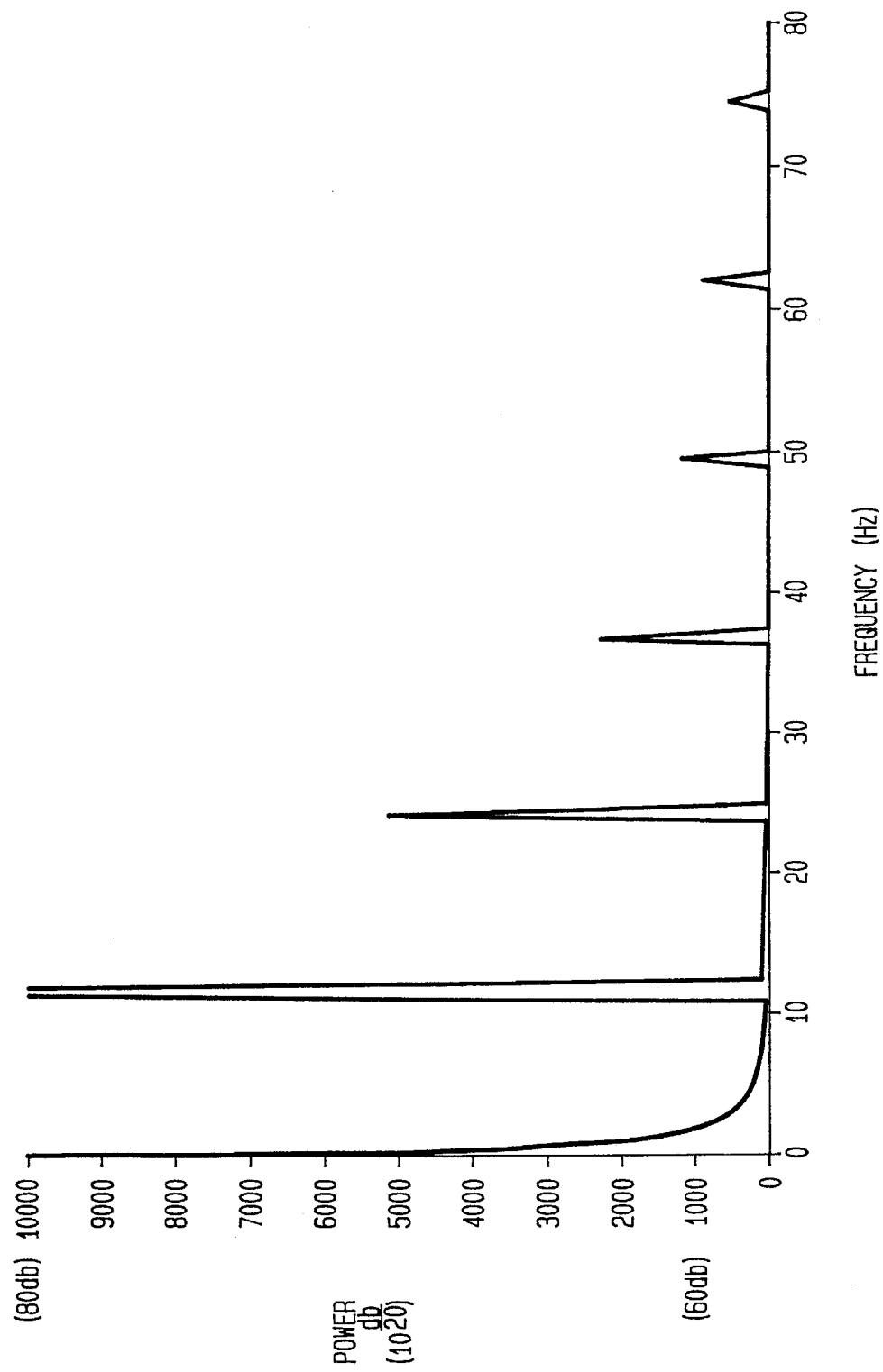

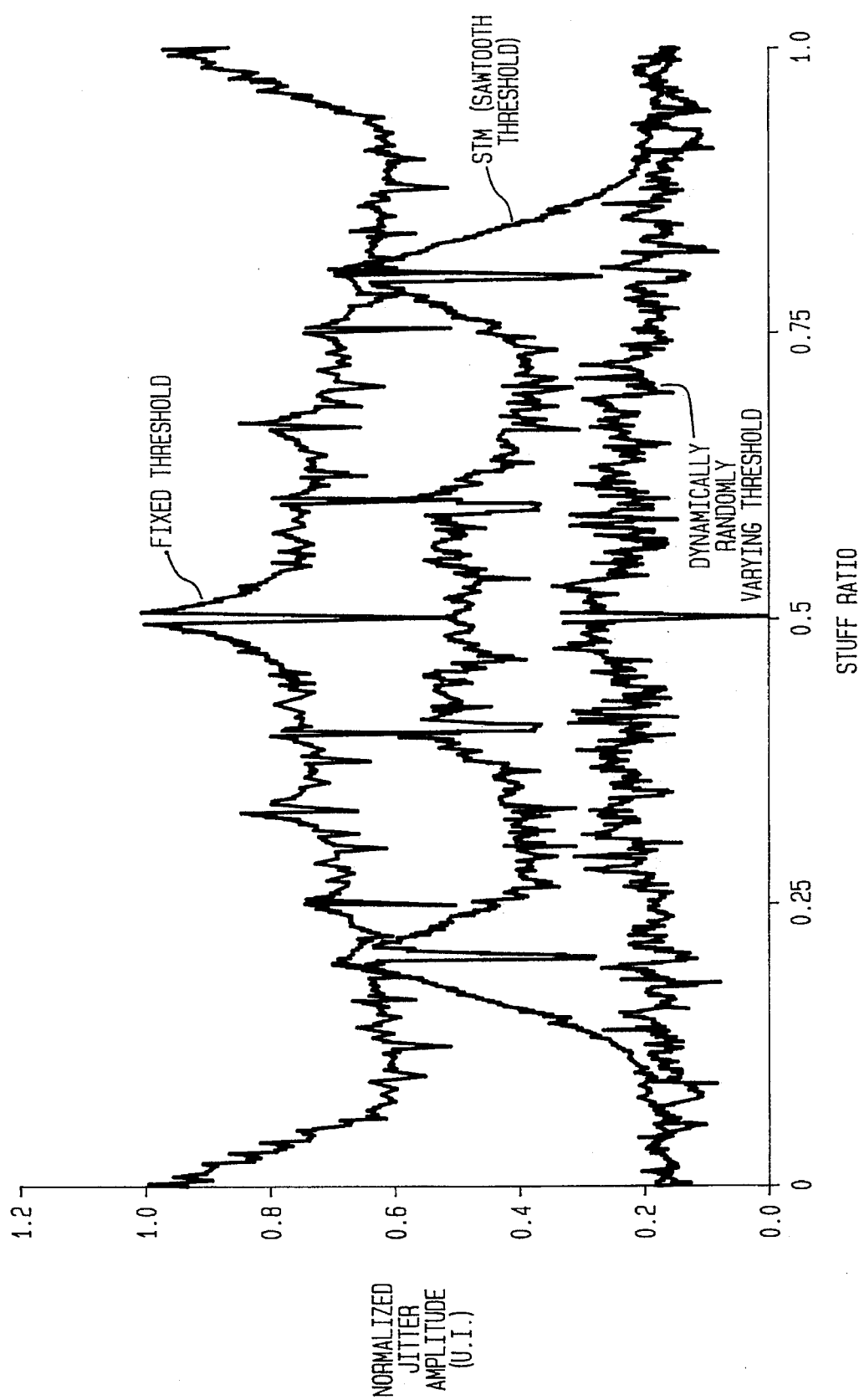

# WAITING TIME JITTER REDUCTION BY SYNCHRONIZER STUFFING THRESHOLD MODULATION

FIELD OF THE INVENTION

The present invention relates to multiplexing one or several lower rate signals into a higher rate signal in digital communication systems. The multiplexing of the lower rate signals can introduce a form of phase variation or jitter into the signals referred to as waiting time jitter. The present invention relates to removing waiting time jitter from the signals.

BACKGROUND OF THE INVENTION

FIG. 1 shows a communications network 10. The communications network 10 is a telephone network. While the invention is illustrated herein using a telephone network, it is equally applicable to other communication networks such as cable television networks, data networks, etc. The communications network 10 includes one or more private branch exchanges (PBX's) 21, one or more end central offices 22, and one or more toll central offices 23 which are interconnected via trunk links 31, 32. The PBX 21 may be at a customer's premises. The PBX 21 illustratively provides for local voice and data communications at the customer premises. The PBX 21 also provides access to the trunks 31 for purposes of enabling communications to other customer premises via the central office 22 and central office 23.

Illustratively, communications is achieved by transmitting a digital signal in the form of a bitstream on the trunks 31 and 32. The PBX 21 converts analog signals transmitted thereon into digital signals. These signals are then multiplexed according to a time division multiplexing scheme into a higher rate signal such as a DS1 signal. The higher rate signals are received at the central office 22. The central office 22 may demultiplex selected lower rate digital signals therefrom for transmission to their respective destination customer premises. The central office 22 may also multiplex selected ones of the higher rate signals received from the trunks 31 into an even higher rate signal, such as a DS2 signal.

Illustratively, at least the higher rate signal into which the lower rate signals are multiplexed, is organized according to a frame structure. FIG. 2 illustrates a frame structure for a DS2 signal. Illustratively, the DS2 signal is organized into master frames 50 with 1,176 bits which master frames comprise four subframes 51, 52, 53 and 54 with 294 bits each. Each subframe 51–54 is assigned to a channel and each channel may be assigned for carrying the data of a corresponding lower rate signal. Each subframe 51, 52, 53 or 54 comprises a series of six groups of forty-nine bits 51-1, 51-2, 51-3, 51-4, 51-5 and 51-6, or 52-1, 52-2, 52-3, 52-4, 52-5 and 52-6, or 53-1, 53-2, 53-3, 53-4, 53-5 and 53-6, or 54-1, 54-2, 54-3, 54-4, 54-5 and 54-6. Each of the groups begins with a control bit labeled M, C, F or X. The bits $M_0$, $M_1$, $F_0$ and $F_1$ are framing bits used to synchronize a receiver to the frames of the signal. The bit X is an alarm bit. The bits $C_1$, $C_2$, $C_3$, and $C_4$ are stuffing control bits for the channels 1, 2, 3 and 4, respectively. Their purpose is explained below.

Each of the first five groups 51-1 to 51-5, 52-1 to 52-5, 53-1 to 53-5 and 54-1 to 54-5 of each subframe 51–54 also includes forty-eight payload bits for carrying data of a lower rate signal. The last group 51-6, 52-6, 53-6 and 54-6 of each subframe 51–54 includes forty-seven payload bits and one stuffing bit $S_1$, $S_2$, $S_3$ or $S_4$. The stuffing bits $S_1$, $S_2$, $S_3$ or $S_4$ may carry either a data bit or a null bit; therefore, the subframes 51–54 may carry two hundred eight-seven or two hundred eighty-eight data bits of the corresponding channel. The purpose of the stuffing bits may be better explained with reference to FIG. 3.

Consider that in multiplexing plural lower rate signals into a higher rate signal, each lower rate signal must be synchronous with the higher rate signal. However, the incoming lower rate signals are likely to be mutually asynchronous with each other. Even if all lower rate signals were generated in synchronism with a single clock, each signal is subject to clock instabilities such as noise and interference, changes in the length of the transmission media (the trunk lines 32, 31), changes in the velocity of propagation of the lower rate signals on the transmission media, doppler shifts and irregular timing information. Such clock instabilities are discussed in greater detail in J. BELLAMY, DIGITAL TELEPHONY, ch. 7, p. 333–360 (1991) which is incorporated herein by reference. Therefore, each of the incoming lower rate signals is first synchronized to the higher rate signal before it is multiplexed therein. FIG. 3 shows an illustrative synchronizer 60 and desynchronizer 70 which may be used for preliminarily synchronizing and multiplexing plural lower rate signals into a higher rate signal and for demultiplexing and regenerating the constituent lower rate signals from the higher rate signal. Illustratively, the synchronizer 60 may be present at the central office switch 22 and the desynchronizer 70 may be present at the central office switch 23. The synchronizer and desynchronizer could therefore be connected together by a trunk line 32.

The synchronizer 60 is provided with an elastic store or buffer 620 for synchronizing an incoming lower rate signal to the higher rate signal. A write clock is illustratively generated by the write clock recovery circuit 610 from incoming payload data of a lower rate signal. The write clock also causes a write pointer counter 615 to increment the write pointer stored therein with each clock pulse. The write pointer is outputted by the write pointer counter 615 to a write address input of the elastic buffer 620 so as to point to each address of the elastic buffer 620 successively. The write clock is furthermore inputted to a write clock input of the elastic buffer 620 so as to enable the elastic buffer 60 to store the next incoming bit. Thus, incoming payload data bits of the lower rate signal are stored in successive addresses of the elastic buffer 620 in synchronism with the write clock.

A local oscillator 640 is provided for generating a read clock for reading out the bits from the elastic buffer 620. For reasons discussed below, the read clock is inputted to the read clock input of the elastic buffer 620 via a logical circuit 645. The logic circuit 645 outputs a "gapped" read clock (which "gapped" read clock is described in greater detail below) to a read pointer counter 625. The gapped read clock causes the read pointer counter 625 to increment a read pointer stored therein with each gapped read clock pulse. The read pointer is outputted by the read pointer counter 625 to a read address input of the elastic buffer 620. Thus, data bits are read out of successive addresses of the elastic buffer in synchronism with the gapped read clock signal outputted from the logical circuit 645.

The provision of the elastic buffer 620 tends to reduce the instabilities in the low rate signal. However, the write clock of at least one of the lower rate signals to be multiplexed is not precisely synchronous with the read clock (of the higher rate signal). Instead, the read and write clocks are nearly synchronous or plesiochronous. If the read clock is faster than the write clock, an underflow may occur in the elastic buffer 620. If the read clock is slower than the write clock, an overflow may occur in the elastic buffer 620. If either an underflow or overflow occurs, a discontinuity is introduced into the low rate signal data that is multiplexed into the high rate signal. Such a discontinuity is referred to as a "slip."

It is desirable to prevent slips from occurring. To prevent the likelihood of both overflow and underflow, a "pulse-stuffing" technique is utilized in the multiplexer 60. According to the pulse-stuffing technique in DS1 to DS2 mapping, the data rate of the channel into which the lower rate signal is multiplexed is purposely made slightly higher than the lower rate signal. The channel has payload bit positions for carrying the data bits of the lower rate signal and stuffing bits, i.e., $S_1$, $S_2$, $S_3$ and $S_4$ for channels 1, 2, 3 and 4, respectively. The stuffing bits can carry either a data bit or a null bit. At times when the write clock is running faster than the read clock, it may be necessary to read out extra bits to prevent an overflow. The extra read-out bits are inserted into the stuffing bit positions. At other times, the stuffing bits carry a null value. The stuffing control bits $C_1$, $C_2$, $C_3$ and $C_4$ are used in their respective subframes 51, 52, 53 or 54 to indicate whether or not the stuffing bit carries a data bit or a null bit. In the DS2 frame, if all of the $C_1$ bits in the subframe 51 are set to logic '1', the stuffing bit $S_1$ carries a data bit. Otherwise, the stuffing bit $S_1$ carries a null bit.

As shown, the write pointer outputted from the write pointer counter 615 and the read pointer outputted from the read pointer counter 625 are inputted to a comparison circuit 630. The comparison circuit 630 forms the phase difference between the write pointer and the read pointer. Illustratively, this is illustrated in FIG. 4(*a*). As shown, the phase difference is of the form of a sawtooth wave with a varying amplitude. Note that the use of the write pointer and read pointer for forming the phase difference is a matter of convenience. Alternatively, the write clock and gapped read clock could be used although additional processing may be necessary to produce the phase difference between these two signals.

The phase difference thus formed is outputted to a justification decision circuit 635. The justification decision circuit illustratively compares the phase difference signal outputted by the comparison circuit 630 to a threshold as shown in FIG. 4(*b*). In response to this comparison, the justification decision circuit 635 outputs a justification signal which comprises plural pulses, including one pulse corresponding to each instance in which the phase difference signal exceeds the threshold. The outputted justification signal is shown in FIG. 4(*c*). (Illustratively, the signals of FIGS. 4(*a*)–(*c*) are exaggerated for purposes of illustrating the invention.) As shown, the pulses of the justification signal have a pulse width equal to the interval during which the phase difference exceeds the threshold.

The justification signal outputted by the justification circuit 635 is inputted as one input to the logic circuit 645 which may be a logic AND gate. As noted above, the logic circuit 645 also receives the read clock generated by the local oscillator 640. Furthermore, the logic circuit 645 may receive a frame timing signal from the multiplexer 650 such as is shown in FIG. 4(*d*). The frame timing signal is high during payload and stuffing bit positions of the channel of the higher rate signal corresponding to the lower rate signal and is low at other times. The justification signal and frame timing signals act as enable signals for enabling the pulses of the read clock to be outputted to from the logic circuit 645. As a result, the logic circuit 645 outputs a gapped read clock signal such as is shown in FIG. 4(*e*). As shown, the gapped read clock signal is not a smooth and continuous clock signal. Rather, the gapped read clock signal is irregular, containing pulses separated by regularly occurring gaps for control bits and irregularly occurring gaps for stuffing bits. Such gaps introduce waiting time jitter into the data signal. Herein, "jitter" means the short term variation of significant instants of a signal from their ideal positions in time. FIG 5(*a*) shows an un-jittered waveform and FIG. 5(*b*) shows the same waveform with jitter. FIG. 5(*c*) is a plot of jitter versus time. The ordinate or amplitude is the amount of phase shift θ(t) measured in unit intervals or u.i. of time, wherein one u.i is equal to one period of the signal. Via a Fast Fourier Transform (FFT), the spectral plot of jitter in the frequency domain can be obtained. Generally speaking, waiting time jitter has an amplitude that depends on the normalized stuff-ratio ρ which is given by:

$$\rho = \frac{f_w - f_r}{F} \quad (1)$$

where:

$f_w$ is the write clock frequency $f_r$ is the read clock frequency, and

F is the frame rate of the higher rate signal

In any event, the average rate of the gapped read clock over a long period of time is approximately the same as the data rate of the incoming data of the lower rate signal. Therefore, the likelihood of slips is dramatically reduced or eliminated. The data read out of the elastic buffer 620 in synchronism with the gapped read clock is multiplexed with other like signals by the data pump 650 to produce a higher rate signal. As discussed above, each channel of the higher rate signal has extra stuffing bits for storing a null bit or a data bit. The data bits read out in synchronism with the gapped read clock are placed in the payload bit positions and the stuffing bit positions of the corresponding channel. The higher rate signal is then transmitted to the desynchronizer 70.

The higher rate signal received by the desynchronizer 70 is first inputted to a data pump 750 which demultiplexes the data of each lower rate signal. In demultiplexing the higher rate signal, it is necessary to generate a clock for the demultiplexed data of each lower rate signal. Because, the data of the lower rate signals are transferred as synchronous data, the derived clock must be continuous. The generation of such a continuous clock is complicated by the insertion of the overhead control bits (e.g., the M, X, F and C bits). However, the overhead bits occur in a predetermined fashion and can be easily removed. The waiting time jitter which occurs because of the predictable overhead bits M, F, C, and X can be removed using an elastic store 720 and a read clock derived from the higher rate signal. Like the synchronizer 60, the desynchronizer 70 includes a write pointer counter 715 and a read pointer counter 725 which perform similar functions as the write pointer counter 615 and read pointer counter 625 in the synchronizer circuit 60.

On the other hand, the waiting time jitter introduced by the pulse-stuffing is significantly more difficult to remove. This is because the gaps produced by the data carrying and null stuffing bits are irregular and unpredictable. Therefore, the clock for the data of the lower rate signal must be generated from the average arrival rate of each channel's data and not from the higher rate signal. To that end, a phase-locked loop (PLL) circuit 760 is provided. The PLL circuit 760 has a voltage controlled oscillator (VCO) 765 which generates a read clock. The read clock generated by the VCO 765 causes the read pointer counter 725 to increment and is inputted to the read clock input of the elastic buffer 720. The read clock generated by the VCO is also inputted to a phase detector of the PLL 760. The phase difference detector 770 also receives the write clock which is generated by the data pump 750 from the higher rate signal. (The write clock also causes the write pointer counter 715 to increment and is inputted to the write clock input of the elastic buffer 720). The phase difference detector circuit 770 outputs, amongst other things, a signal corresponding to the phase difference of the read clock and the write clock. (Illustratively, the phase difference detector multiplies the read clock signal and the write clock signal. This produces a harmonic which corresponds to the difference between the phase of the read clock and the write clock, as well as other higher frequency harmonics.) The signal outputted by the phase difference detector circuit 770 is low pass filtered in the low pass filter (LPF) 775. (This signal may be low pass filtered by one or more than one low pass filters to remove the undesired harmonics of the signal outputted by the phase difference detector circuit 770.) The low-pass filtered phase difference is then fed as a control input to the VCO 765 to adjust the read clock generated therefrom. The net result is that a relatively smooth and continuous read clock is produced from the irregular, gapped write clock with approximately the average rate as the write clock.

The data read out of the elastic buffer 720 and the smoothed read clock are inputted to a line interface 780. The line interface 780 illustratively regenerates the lower rate signal from the smoothed read clock and the read-out data. The line interface 780 may include a LPF 785 to further smooth the read clock.

The synchronizer 60 and desynchronizer 70 enable communications which removes most of the waiting time jitter. However, the waiting time jitter introduced by pulse-stuffing can have frequency components down to 0 Hz. This is illustrated in FIG. 4(*f*) which shows the justification signal produced by the justification decision circuit 635 superimposed on the phase difference signal produced by the phase comparison circuit 630. The justification signal corresponds to a (relatively) high frequency waiting time jitter component. However, the envelope of the phase difference signal corresponds to a (relatively) low frequency waiting time jitter component. Even with a relatively large elastic buffer 720 and slowly adjusted read clock, some low frequency jitter will always be present.

Waiting time jitter produced by pulse-stuffing has been studied in the prior art. See D. Duttweiler, *Waiting Time Jitter*, BELL SYS. TECH. J., vol. 51, pp. 165–207, January, 1972; P. E. K. Chow, *Jitter Due to Pulse Stuffing Synchronization*, IEEE TRANS. COMM., vol. COM-21, pp. 854–859, July, 1973; W. Grover, T. Moore & J. McEachern, *Waiting Time Jitter Reduction by Synchronizer Stuff Threshold Modulation*, PROC. OF GLOBECOMM, pp. 13.7.1–13.7.5 (1987); G. Pierbon & R. Valussi, *Jitter Analysis of a Double Modulated Threshold Pulse Stuffing Synchronizer*, IEEE TRANS. COMM., vol. 39, no. 4, pp. 594–602, April, 1991. Of these prior art references, the article W. Grover, T. Moore & J. McEachern, *Waiting Time Jitter Reduction by Synchronizer Stuff Threshold Modulation*, PROC. OF GLOBECOMM, pp. 13.7.1–13.7.5 (1987) suggests a novel approach to removing low frequency waiting time jitter. This article proposes a stuff threshold modulation (STM) technique wherein the low frequency jitter is "modulated," i.e., changed, to a higher frequency. Such a higher frequency jitter is then easily removed by a conventional PLL circuit 760 (FIG. 3) in the desynchronizer 70. To that end, this article proposes to use a sawtooth threshold signal, such as shown in FIG. 4(*g*), rather than a fixed threshold, in the justification decision circuit 635 (FIG. 3). That is, the phase difference produced by the pointer comparison circuit 630 (FIG. 3) at each instant is compared to a sawtooth waveform threshold at the corresponding instant in the justification decision circuit 635, as shown in FIG. 4(*h*). The justification decision circuit 635, in turn, generates a pulse having a pulse width that equals the period during which the phase difference exceeds the sawtooth threshold as shown in FIG. 4(*i*). The net result is that overflow and underflow are still avoided in the elastic buffer 620 of the synchronizer 60 but the waiting time jitter produced by the pulse-stuffing is modulated to a higher frequency. The PLL circuit 760 of the desynchronizer 70 then filters out the high frequency waiting time jitter, including the part of the low frequency jitter which is modulated to a higher frequency. As a result, less residual low frequency waiting time jitter is present in the recovered clock.

The STM technique reduces the amount of waiting time jitter. However, the level of the waiting time jitter is still unacceptably high for some applications.

It is therefore an object of the present invention to overcome the disadvantages of the prior art.

SUMMARY OF THE INVENTION

This and other objects are achieved according to the present invention. The invention illustratively may be used in a synchronizer of a communications system which multiplexes a number of lower rate signals into a higher rate signal. Generally speaking, the lower rate signals are mutually asynchronous lower rate signals and therefore must first be synchronized to the higher rate signal. This is achieved by writing the data of each lower rate signal into an elastic buffer in synchronism with a write clock generated from the data of the respective lower rate signal. The data is then read-out of its respective elastic buffer in dependence on a locally generated read clock that is synchronized to the higher rate data signal. Illustratively, the higher rate data signal has plural channels including one channel for carrying the data of each lower rate signals. Each channel has a slightly higher bandwidth than necessary to carry the data of the lower rate signal. The excess bandwidth is used for carrying stuffing bits. When the rate of reading out bits from the elastic buffer is slower than the rate at which bits are written in the elastic buffer, extra bits are read-out and placed in the stuffing bit positions of the respective channels. This ensures that the elastic buffer does not overflow.

According to one embodiment, a write signal controls the writing of data in the elastic buffer and a read signal controls the reading out of data from the elastic buffer. For instance, the read signal may be a read pointer, which successively points to locations from which bits of the lower rate signal are read. Likewise, the write signal illustratively is a write pointer which successively points to locations in the buffer in which bits of the lower rate signal are written. However, the write and read signals can also be the write clock and the read clock. (Note that the write pointer is generated from the write clock and the read pointer is generated from the read clock.) A comparison circuit illustratively may be provided which compares the read signal to the write signal. In response to this comparison, the comparison circuit generates a phase difference signal. The phase difference signal is received at a justification decision circuit. The justification decision circuit compares the phase difference signal to a dynamically randomly varying threshold signal. Depending on this comparison, the justification decision circuit generates a justification signal having plural pulses including one pulse corresponding to each instance in which the phase difference signal exceeds the dynamically randomly varying threshold. Illustratively, each pulse has a pulse-width equal to the interval during which the phase difference signal exceeds the randomly varying threshold signal. The pulses of the justification signal regulate the read signal which in turn controls the reading out of the data of the lower rate signal from the elastic buffer.

Illustratively, the dynamically randomly varying threshold signal need not be a strictly random signal. Rather, a pseudo random sequence of threshold values may be used. Illustratively, such values may be predetermined through simulation. For instance, the threshold values may be randomly selected to fall within a preset range. The range may be adjusted to produce optimum threshold values for a given synchronizer (i.e., knowing ahead of time the data rates of the lower rate and higher rate signals, the organizations of the lower and higher rate signals into payload data bits, stuffing bits and overhead control bits, and the permissible phase tolerances for each of these signals). The pseudo random sequence may then be stored in a circuit, such as a ROM, and dynamically outputted to the justification decision circuit.

An optimized random stuffing threshold modulation system and process for reducing waiting time jitter in a pulse-stuffing synchronization system is therefore provided. The process and system according to the present invention substantially reduce waiting time jitter, in particular low frequency waiting time jitter.

BRIEF DESCRIPTION OF THE DRAWING

FIG. 4($a$) depicts a phase difference signal generated in a conventional pointer comparison circuit.

FIG. 4($b$) illustrates the comparison of a phase difference signal of FIG. 4($a$) to a fixed threshold.

FIG. 4($c$) depicts a justification signal produced by the comparison of FIG. 4($b$).

FIG. 4($d$) depicts a conventional frame timing signal generated by a multiplexer data pump.

FIG. 4($e$) depicts a gapped clock outputted from the logic circuit 645 of FIG. 3.

FIG. 4($f$) illustrates low and high frequency harmonics of waiting time jitter.

FIG. 4($g$) depicts a sawtooth waveform threshold used in an STM technique.

FIG. 4($h$) illustrates the comparison of the phase difference signal of FIG. 4($a$) to the sawtooth waveform threshold signal of FIG. 4($g$).

FIG. 4($i$) depicts a justification signal produced by the comparison illustrated in FIG. 4($h$).

FIG. 5($b$) depicts the signal of FIG. 5($a$) with jitter.

FIG. 5($c$) depicts a plot of the jitter introduced into the jittered signal of FIG. 5($b$).

FIG. 9 illustrates a plot of the performance comparison of the fixed threshold technique, the STM technique and the technique according to an embodiment of the present invention.

DETAILED DESCRIPTION OF THE INVENTION

Figure 1:
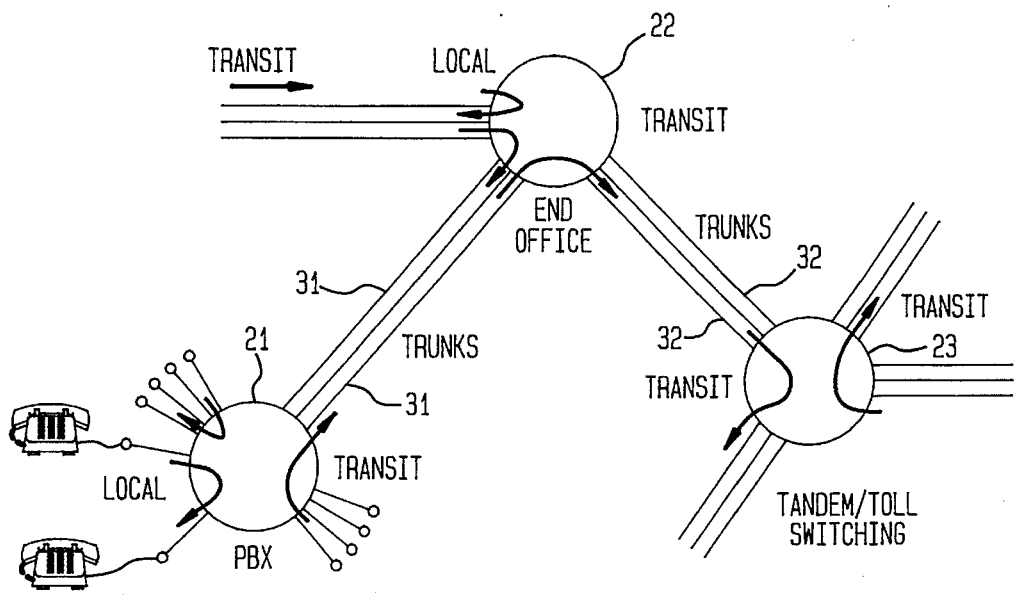
FIG. 1 depicts a conventional communication system.
Figure 2:
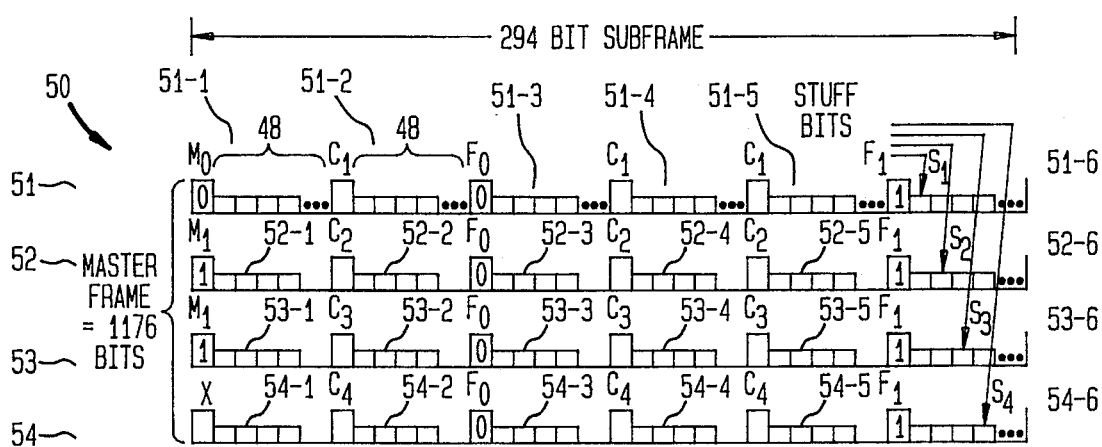
FIG. 2 depicts a conventional frame organization for a DS2 signal.
Figure 3:
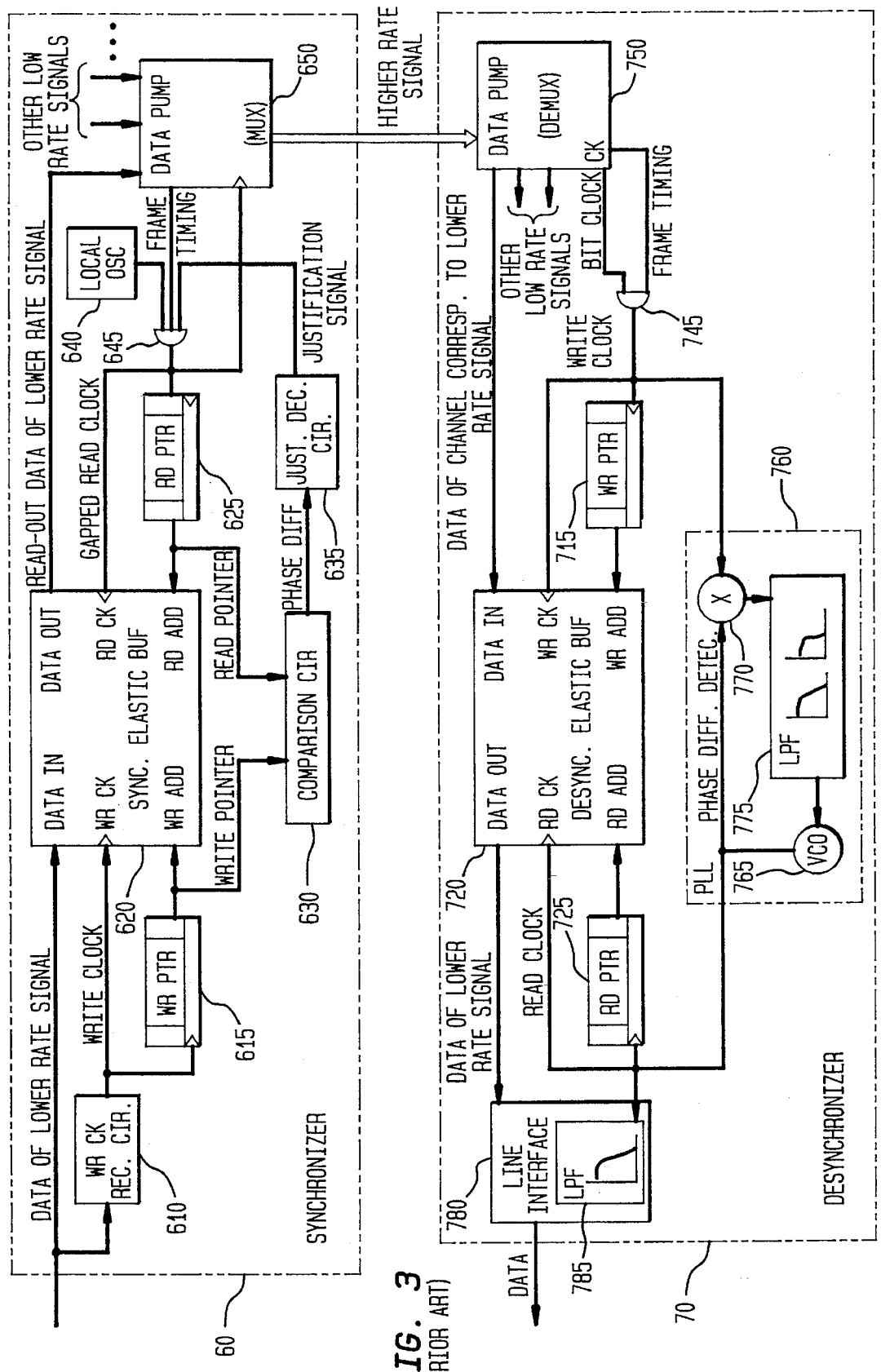
FIG. 3 depicts a synchronizer and desynchronizer which are used in the communication system of FIG. 1.
Figures 5A, 5B, 5C:
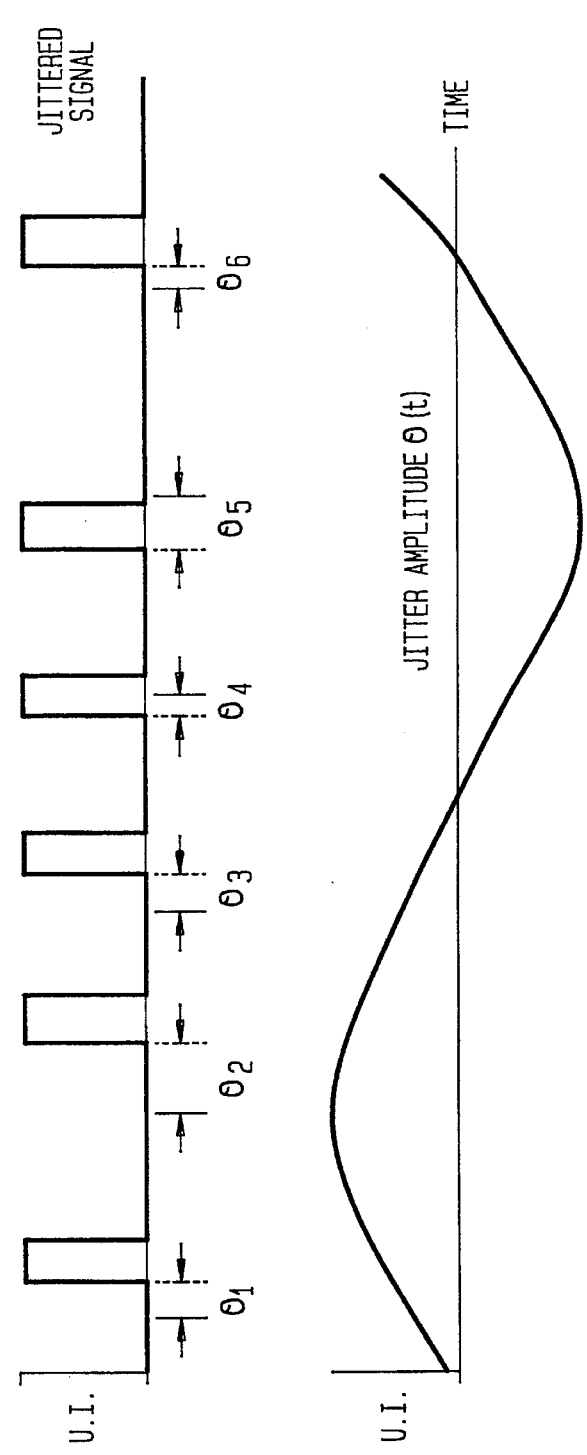
FIG. 5($a$) depicts an unjittered signal.
Figure 6:
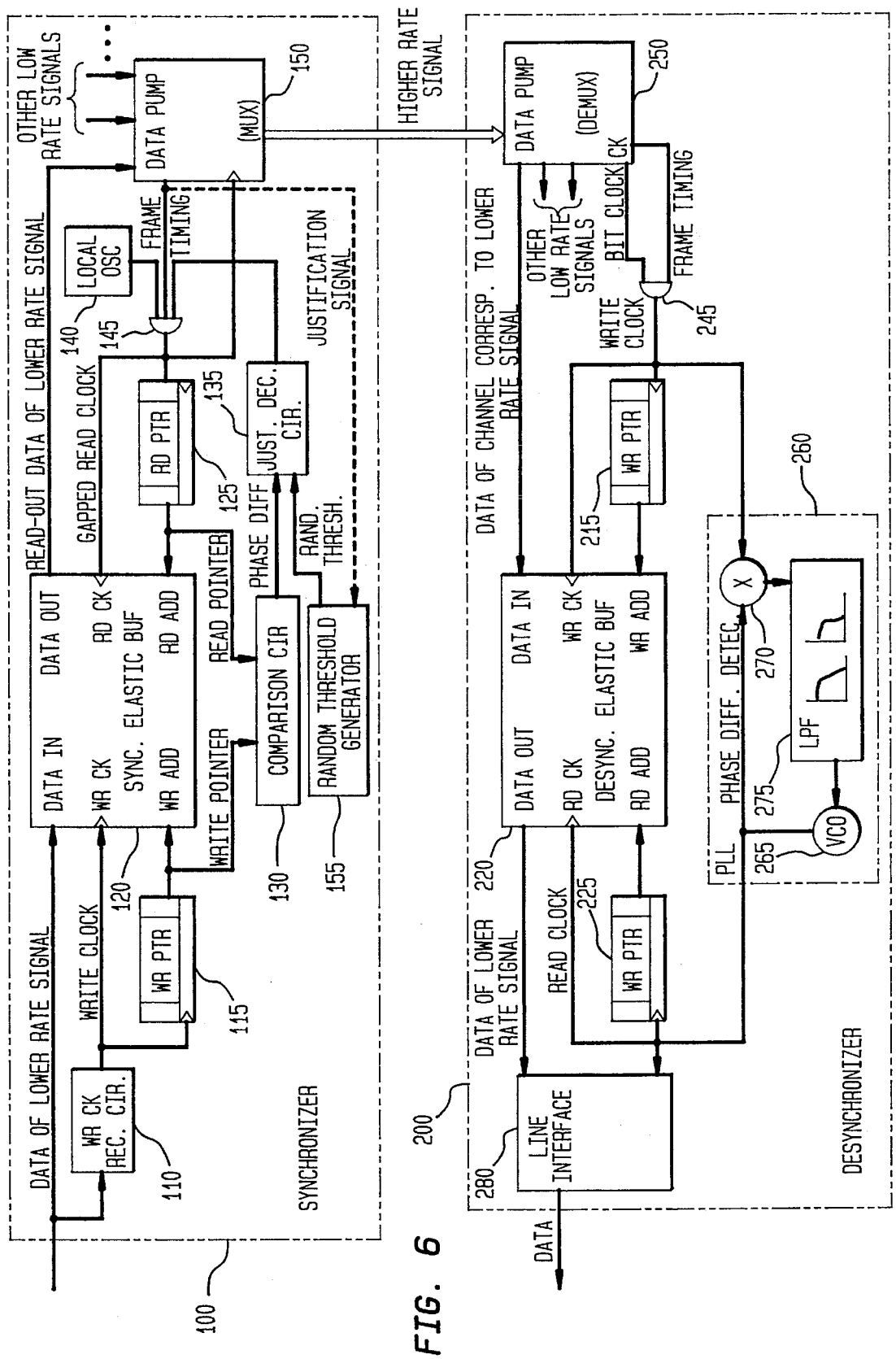
FIG. 6 depicts a synchronizer and desynchronizer according to an embodiment of the present invention.

FIG. 6 depicts a synchronizer 100 and desynchronizer 200 according to the present invention. The synchronizer receives plural lower rate signals and synchronizes them to a higher rate signal generated at the synchronizer 100. The synchronizer 100 then multiplexes the data of the lower rate signals into channels of the higher rate signal. The desynchronizer 200 demultiplexes the data of each lower rate signal from the higher rate signal. The desynchronizer 200 also generates a continuous clock for the data of each lower rate signal. The synchronizer 100 and desynchronizer 200 are provided with suitable circuitry for processing each of the plural lower rate signals in parallel although only sufficient circuitry is shown for processing a single lower rate signal. Construction of a synchronizer 100 and desynchronizer 200 for any arbitrary number of plural lower rate signals will be readily apparent from the discussion below.

The data of a received lower rate signal is inputted to a synchronizer elastic buffer 120. The data is also received at a write clock recovery circuit 110 which recovers a write clock therefrom. The recovered write clock is inputted to a write clock input of the elastic buffer 120 and an increment input of a write pointer counter 115. The write pointer counter 115 increments the write pointer therein by one each write clock pulse and outputs the write pointer therein to a write address input of the synchronizer elastic buffer 120. Thus, each received data bit of the lower rate signal is stored in successive locations of the buffer 120.

A local oscillator 140 is provided which generates a clock that is synchronized to the higher rate signal. The locally generated clock is inputted to a logic circuit 145 such as a logical AND gate. The logic circuit 145 also receives a justification signal and an overhead timing signal. In response to these signals, the logic circuit 145 logically AND's the inputted signals and outputs a gapped read clock. The gapped read clock is inputted to the read clock input of the elastic buffer 120. The gapped read clock is also inputted to the clock input of a read pointer counter 125. The read pointer counter 125 increments the read pointer therein by one for each pulse of the gapped read clock and outputs the read pointer therein to a read address input of the elastic buffer 120. Thus, bits are successively read out of successive locations of the synchronizer elastic buffer 120.

As shown, the write pointer outputted from the write pointer circuit 115 and the read pointer outputted from the read pointer circuit 125 are both fed to a comparison circuit 130. This, however, is merely illustrative. The comparison circuit 125 could alternatively receive the write clock recovered by the write clock recovery circuit 110 and the gapped read clock outputted by the logic circuit 145. (Note that the write pointer is generated from the write clock and the read pointer is generated from the gapped read clock.) The comparison circuit 130 generates a phase difference signal equal to the phase difference between the read and write pointers. The phase difference signal produced by the comparison circuit 130 is fed to a justification decision circuit 135.

Figure 7:
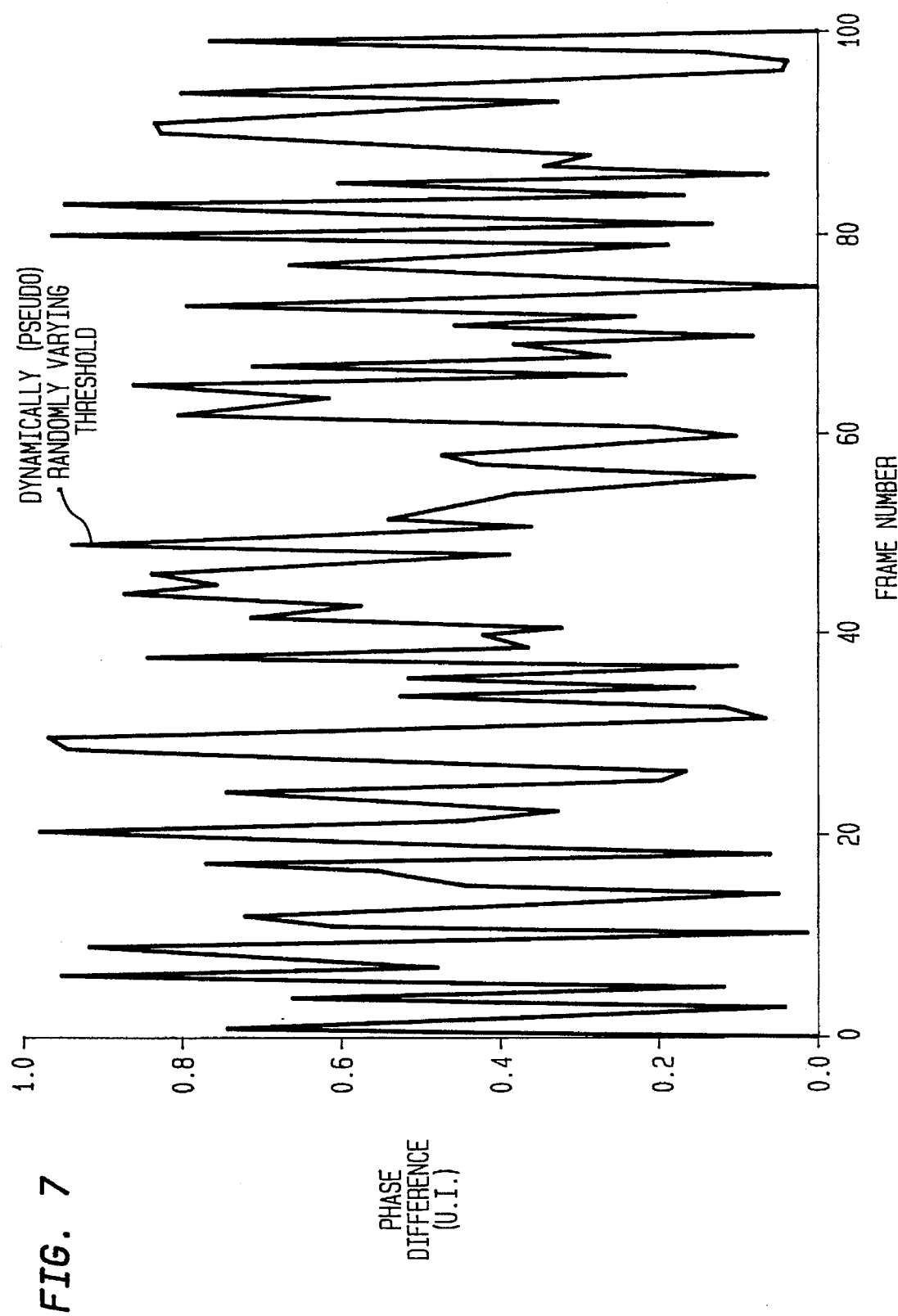
FIG. 7 depicts an illustrative threshold waveform according to an embodiment of the present invention.

A random threshold generator circuit 155 is also provided which generates a dynamically randomly varying threshold signal. FIG. 7 illustrates an illustrative random threshold signal waveform generated by the random threshold generator circuit 155. Illustratively, the random threshold generator 155 need not generate a strictly random signal. Rather, the random threshold generator may output a pseudo random signal. For instance, the random threshold generator 155 may include a memory circuit such as a ROM which stores a repeating sequence of, for example, about 100 random threshold values.

Figure 10:
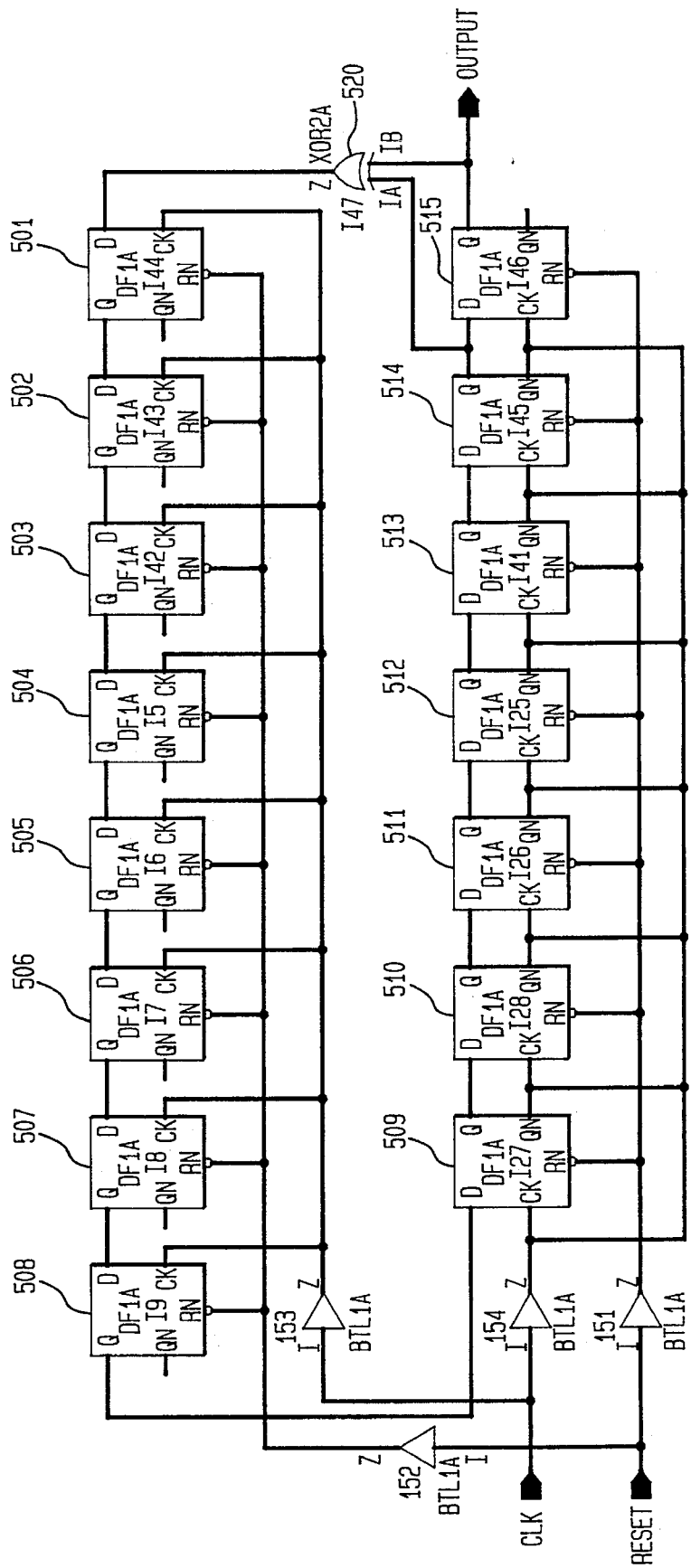
FIG. 10 depicts a pseudo random sequence generator circuit.

Alternatively, the pseudo random sequence generator circuit 500 shown in FIG. 10 may be used to generate the repeating pseudo random sequence. As shown, the circuit 500 includes plural D-type flip-flops 501, 502, 503, 504, 505, 506, 507, 508, 509, 510, 511, 512, 513, 514, and 515. As shown, the flip flops 501–515 are connected in tandem. That is, the output Q of the flip flop 501 is connected to the input D of the flip flop 502. The output Q of the flip flop 502 is connected to the input D of the flip flop 503, etc. The output Q of the flip flop 515 serves as the output of the circuit 500. The outputs of the flip flops 514 and 515 are inputted via XOR gate 520 to the flip flop 501. Initially, a particular sequence of bits is stored in the flip flops 501–515. These bits are shifted out of the tandem connected flip flops 501–515. While shifting the bits out, the XOR of each consecutive pair of the bits is shifted into the flip flops 501–515 via XOR gate 520. With proper selection of the initially stored sequence, the circuit 500 can produce a pseudo random sequence which is a good approximation of a random sequence of threshold values.

The random threshold generator 155 outputs each threshold value during a corresponding frame interval. The pseudo random sequence can be generated "off-line," i.e., in a separate processor running a simulation. That is, a processor is programmed to run a simulation and is provided with the operating characteristics of the synchronizer and desynchronizer, namely, the frame formatting of the lower rate and higher rate signals, the rates of each signal, the tolerances for each signal, the number of justification bits or bytes, the bandwidth of timing extracting circuitry and clock smoothing circuitry, etc. The simulation process executed by the processor generates simulated input lower rate signals, multiplexes these lower rate signals in a simulated synchronizer 100 and demultiplexes the signals in a simulated desynchronizer 200. The simulation is performed using different parameters for generating a (pseudo) dynamically randomly varying threshold and the performance of the synchronizer and desynchronizer (i.e., the amount of waiting time jitter produced in the desynchronized lower rate data) is measured. For instance, the random sequence may be controlled by selecting upper and lower boundaries (in u.i. units) between which the pseudo random values must fall. An optimum (pseudo) random varying threshold signal is selected which produces the best performance, i.e., least amount of waiting time jitter. This selected dynamically randomly varying threshold signal is then stored in the ROM of the random threshold generator 155.

The dynamically randomly varying threshold signal is inputted to the justification decision circuit 135. The justification decision circuit 135 compares the phase difference signal and the dynamically randomly varying threshold signal. In response to this comparison, the justification decision circuit 135 outputs a positive and/or negative justification signal. The justification signal comprises a series of pulses including one pulse corresponding to each instant of time during which the phase difference signal exceeds the dynamically randomly varying threshold signal. Each pulse has a pulse width equal to the duration of the interval of time during which the phase difference signal exceeds the dynamically randomly varying threshold signal.

The justification signal thus produced by the justification decision circuit 135 is also fed as an enable control signal to the logic gate 145. To facilitate dividing the bits into time slots, a frame timing signal is inputted to the logic gate 145 for enabling the reading out of bits from the elastic buffer 120 only during payload and stuffing bit positions of the time slots corresponding to the lower rate signal. The logic circuit 145 outputs a gapped read clock comprising pulses trains produced by the local oscillator 140 that are separated by gaps produced by the frame timing signal and the justification signal. The gaps produced by the frame timing signal occur regularly whenever overhead control bits of the higher rate signal occur. The gaps produced by the justification circuit occur irregularly whenever a null stuffing bit of the higher rate signal occurs. The read-out bits are inputted to a data pump 150 which multiplexes the bits into payload and stuffing bit positions of an appropriate time-slot assigned to the lower rate signal.

The higher rate signal is transmitted to the desynchronizer 200 and is received at a data pump 250 thereat. The data in the time slots assigned to the channel carrying the data of the lower rate signal is demultiplexed from the higher rate signal. This data is inputted to a desynchronizer elastic buffer 220. Furthermore, a bit clock is outputted from the data pump 250 which is a smooth, continuous clock recovered from the control and data bits of the higher rate signal. In addition, a frame timing signal is outputted which has pulses corresponding to the payload and data-bit carrying stuffing bit positions of the higher rate signal and gaps corresponding to control bit positions and null-stuffing bit positions of the higher rate signal. (The higher rate signal illustratively includes stuffing control bits such as the C bits of the DS2 signal which indicate whether or not the stuffing bits carry data or are null stuffing bits.) Both of these signals are fed to a logic circuit 245 which outputs a gapped write clock 245.

The gapped write clock is fed to a write clock input of the desynchronizer elastic buffer 220. A write pointer counter 215 is provided which receives the gapped write clock at an increment input thereof. In response, the write pointer counter 215 increments the write pointer therein by one for each pulse of the gapped write clock. The write pointer counter 215 outputs the write pointer stored therein to a write address input of the desynchronizer elastic buffer 220. This causes the desynchronizer elastic buffer 220 to write the demultiplexed data of the lower rate signal into successive locations of the desynchronizer elastic buffer 220.

The gapped write clock is fed to a PLL circuit 260. Specifically, the gapped write clock is received at a phase difference detector 270. The phase difference detector also receives a read clock signal produced by a VCO 265 of the PLL 260. The phase difference detector 210 outputs a phase difference between the read clock and gapped write clock to a low pass filter 275 of the PLL 260. The low-pass filtered phase difference is then fed to a control input of the VCO 265. In response, the VCO 265 adjusts the frequency of the read clock.

The read clock thus generated is outputted to a read clock input of the desynchronizer elastic buffer 220 and to the increment input of a read counter 225. In response to each pulse of the read clock, the read counter 225 increments the read pointer therein by one. The read pointer is outputted to a read address input of the desynchronizer elastic buffer 220. This causes the desynchronizer elastic buffer 220 to read-out the data of the lower rate signal from successive storage locations of the desynchronizer elastic buffer.

The read-out data of the lower rate signal and the read clock are fed to a line interface 280.

Figure 8A:
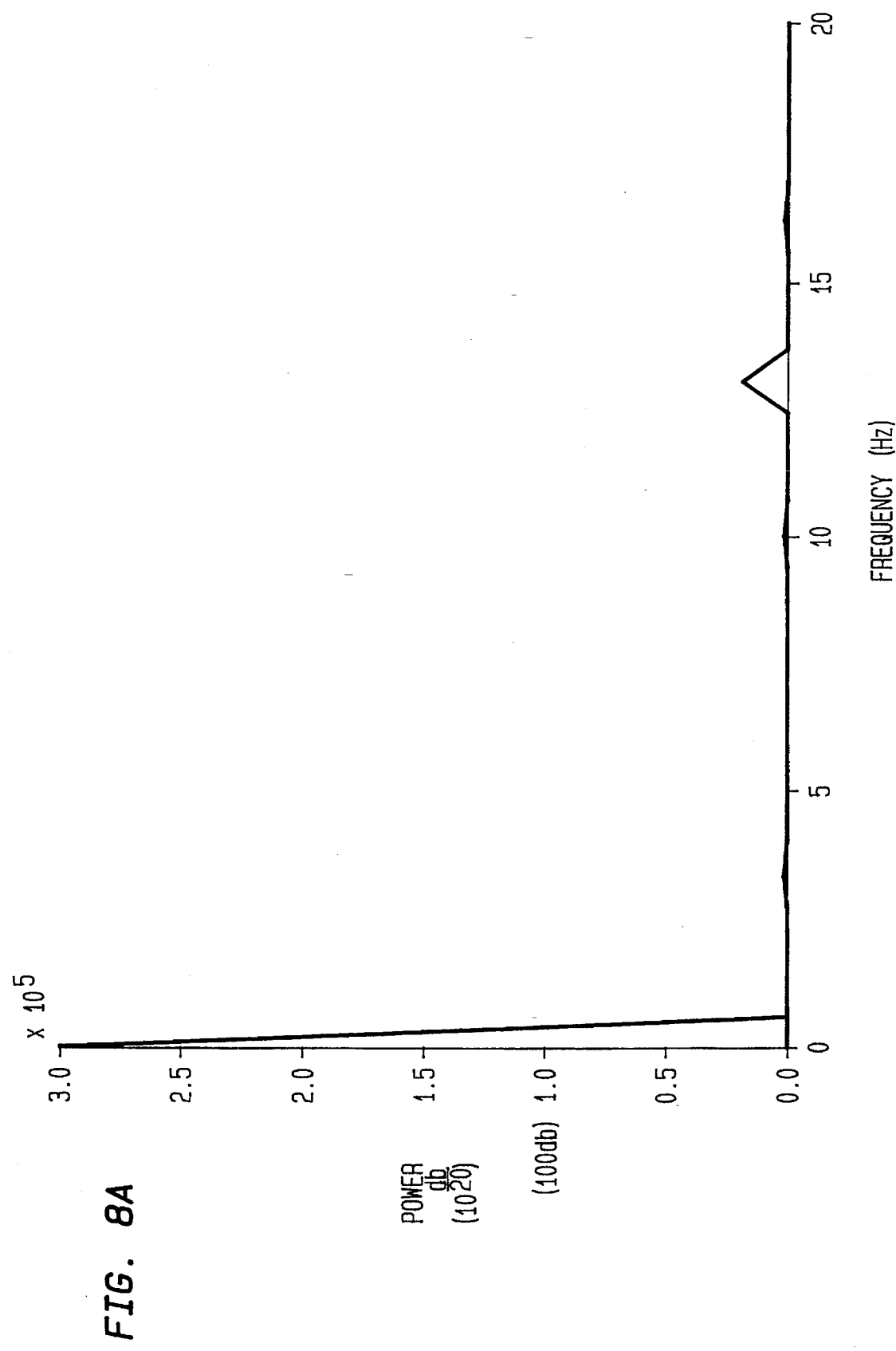
FIGS. 8($a$)–($c$) depict the power spectrum of waiting time jitter produced using a fixed threshold, an STM technique and the technique according to an embodiment of the present invention.
Figure 8C:
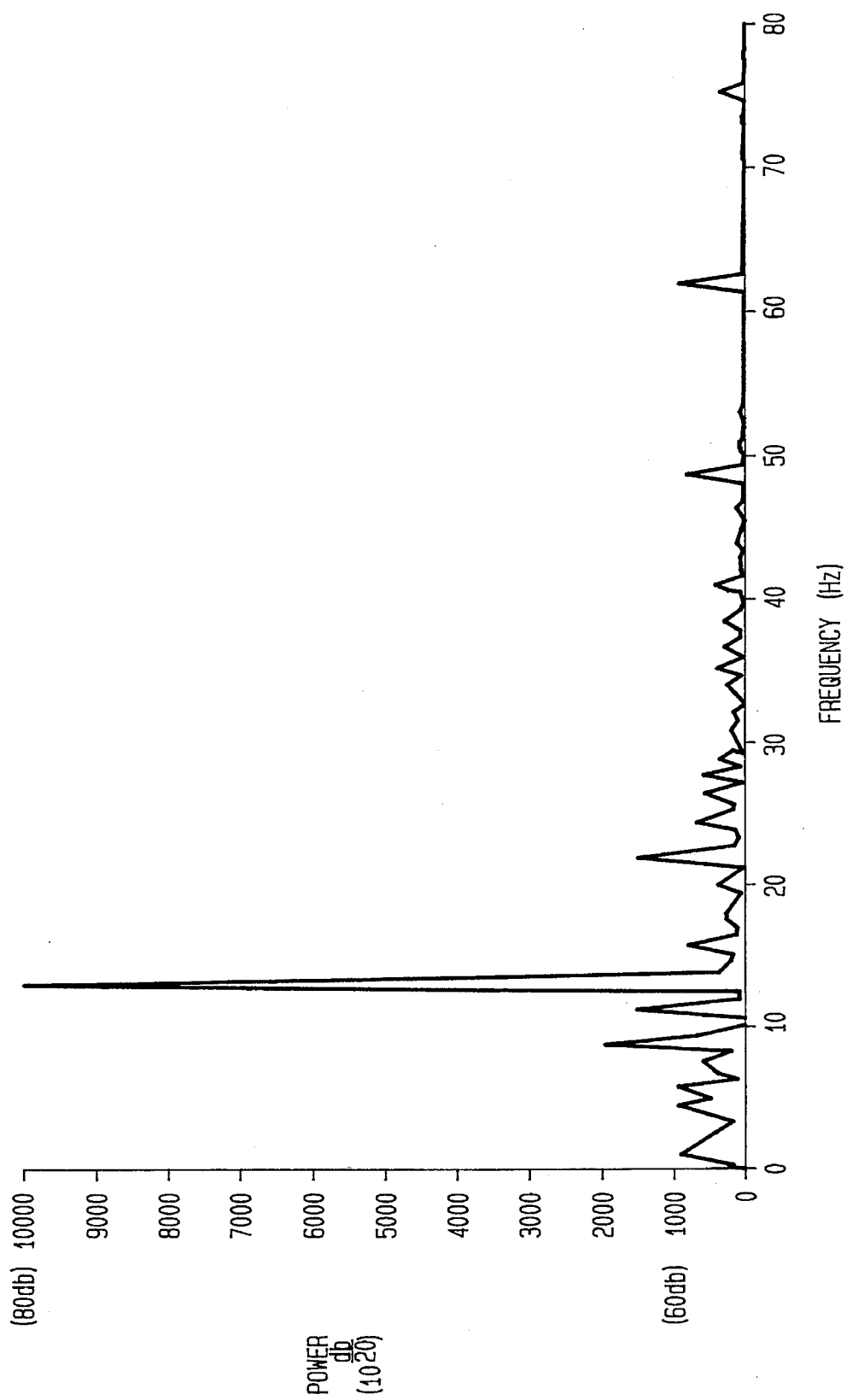

By utilizing a dynamically randomly varying threshold, more of the low frequency waiting time jitter introduced into the data of the lower rate signal by pulse-stuffing is modulated onto a higher frequency. Because the waiting time jitter is at a higher frequency, the PLL circuit 260 can remove more of the waiting time jitter (in the low pass filter 275). Thus, waiting time jitter is reduced overall. This can be appreciated by comparing the results of the present invention to the prior art. FIG. 8(*a*) shows the power spectrum of waiting time jitter which results when a fixed threshold is used. As shown, an extremely high percentage of the waiting time jitter is below 10 Hz—even below 5 Hz. Next, FIG. 8(*b*) shows the power spectrum of the conventional STM pulse-stuffing process utilizing a sawtooth waveform threshold. As shown, the amount of waiting time jitter below 10 Hz is less although most of the low frequency jitter below 10 Hz is concentrated at 0 Hz and the immediately adjacent frequencies (i.e., 1–5 Hz). Finally, FIG. 8(*c*) shows the power spectrum of the pulse-stuffing process according to the present invention which uses a dynamically randomly varying threshold (e.g., the pseudo random sequence shown in FIG. 7). As shown, a much smaller amount of the waiting time jitter is below 10 Hz than in the fixed threshold or sawtooth threshold techniques. Therefore, much more of the jitter can be removed since the jitter tends to be at a higher frequency.

Finally, FIG. 9 is graph of the performance of the fixed threshold, STM saw-tooth threshold and the dynamically randomly varying threshold pulse-stuffing techniques according to the present invention. The performance is measured by plotting the normalized jitter amplitude (ordinate) versus stuffing ratio (abscissa). As indicated in FIG. 9, the amplitude of the residual jitter in the recovered (read clock) signal of the demultiplexed lower rate signal data using the inventive (dynamically randomly varying threshold) technique is smaller than that of the fixed threshold and STM sawtooth techniques for nearly every stuffing ratio.

In short, a pulse-stuffing scheme is disclosed in which plesiochronous lower rate signals are multiplexed into a higher rate signal. Each lower rate signal is written into an elastic buffer in accordance with a write signal, which is derived from the data of the lower rate signal, and read out in accordance with a read signal, that is locally generated. A comparison circuit forms the phase difference between the write and read signals. A justification circuit compares the phase difference to a randomly varying threshold and outputs a justification signal having pulses with pulse widths equal to corresponding intervals during which the phase difference exceeds the dynamically randomly varying threshold. The pulses of the justification signal regulate the reading out of the data of the lower rate signal from the elastic buffer.

Finally, the above discussion is intended to be merely illustrative of the invention. Those having ordinary skill in the art may devise numerous alternative embodiments without departing from the spirit and scope of the following claims.

The claimed invention is:

1. A process for communicating comprising:

writing a received signal into a buffer in accordance with a write signal derived from said received signal, reading out said received signal from said buffer in accordance with a locally generated read signal, and regulating said read signal depending on instances in which a phase difference between said write signal and said read signal exceed a dynamically randomly varying threshold.

2. The process of claim 1 further comprising the steps of:

multiplexing said signal read out of said buffer into a higher rate signal, demultiplexing said multiplexed signal from said higher rate signal, and regenerating a smooth clock from said demultiplexed signal using a phase-locked loop.

3. The process of claim 2 wherein said step of regenerating comprises the steps of:

deriving a second write signal from said demultiplexed data, locally generating a second read signal, forming a phase difference between said second write signal and said second read signal, low-pass filtering said phase difference between said second write and said second read signal, and adjusting the generation of said second read signal depending on said low-pass filtered phase difference signal.

4. The process of claim 3 wherein said step of low-pass filtering further comprises the step of:

filtering out waiting time jitter which was introduced by said step of reading and which was modulated to a higher frequency by said step of regulating.

5. The process of claim 1 wherein said step of regulating modulates low frequency waiting time jitter introduced by said step of reading to a higher frequency.

6. The process of claim 1 wherein said step of regulating further comprises:

forming a phase difference between said write signal and said read signal, generating a dynamically randomly varying threshold, comparing said phase difference to said dynamically randomly varying threshold, and generating a justification signal which comprises a plurality of pulses including one pulse corresponding to each instance in which said phase difference exceeds said dynamically randomly varying threshold.

7. The process of claim 6 further comprising the steps of:

generating a continuous local clock signal, producing gaps in said continuous local clock signal depending on said pulses of said justification signal, and enabling the reading out of data from said buffer in said step of reading only in the absence of gaps in said justification signal.

8. The process of claim 6 wherein said dynamically randomly varying threshold is a repeating sequence of pseudo random values.

9. The process of claim 8 further comprising the step of:

preliminarily generating an optimum sequence of pseudo random values, and generating said dynamically randomly varying threshold by reading out said optimum sequence of pseudo random values.

10. The process of claim 1 further comprising:

multiplexing said signal read out during said step of reading out into payload and stuffing bit positions of a channel corresponding to said received signal.

11. The process of claim 10 wherein said stuffing bits contain data of said read out signal or a null bit depending on a relative rate of said write signal and said read signal.

12. The process of claim 1 wherein said write signal is a write pointer signal derived by incrementing a write pointer with each clock pulse of a write clock generated from said received signal.

13. The process of claim 1 wherein said read signal is a read pointer signal generated by incrementing a read pointer with each clock pulse of a locally generated clock.

14. A process for multiplexing plural plesiochronous signals into respective time slots of a higher rate signal comprising the steps of:

for each lower rate signal:
  writing data of said lower rate signal into a buffer in accordance with a write signal derived from said data of said lower rate signal,
  reading out said data of said lower rate signal from said buffer in accordance with a locally generated read signal, and
  regulating said read signal depending on instances in which a phase difference between said write signal and said read signal exceed a dynamically randomly varying threshold, and
multiplexing said data of each lower rate signal read out during said step of reading out into a respective time slot of said higher rate signal.

15. The process of claim 14 further comprising:

demultiplexing said data of each lower rate signal, and for said data of each lower rate signal:
  writing data of said lower rate signal into a second buffer in accordance with a second write signal derived from said higher rate signal,
  generating a smooth second read signal from said second write signal using a phase locked loop, and
  reading out said data of said lower rate signal from said second buffer in accordance with said second read signal.

16. A synchronizer for synchronizing a received plesiochronous signal comprising:

a buffer, in which said received signal is written in accordance with a write signal that is derived from said received signal, and from which said received signal is read out in accordance with a locally generated read signal, and a justification decision circuit receiving a dynamically randomly varying threshold and a phase difference between said write signal and said read signal for regulating said reading out of said local signal from said buffer depending on instances in which said phase difference exceeds said dynamically randomly varying threshold.

17. The synchronizer of claim 16 further comprising:

a memory for storing a sequence of pseudo random threshold values and for outputting said sequence of pseudo random threshold values to said justification decision circuit as said dynamically randomly varying threshold.

18. The synchronizer of claim 16 further comprising:

a write clock recovery circuit, for recovering a write clock from said received signal and outputting said write clock to a write clock input of said buffer, a write counter, receiving said write clock, for incrementing a write pointer therein, and for outputting said write pointer to a write address input of said buffer, a logic circuit for receiving a justification signal from said justification circuit and said read clock signal and for outputting a gapped read clock in response thereto to a read clock input of said buffer, and a read counter, for receiving said gapped read clock, for incrementing a read pointer therein, and for outputting said read pointer to a read address input of said buffer.

19. A communication system comprising a synchronizer for multiplexing plural received plesiochronous signals into respective time slots of a higher rate signal comprising:

for each received signal:
  a buffer, in which said received signal is written in accordance with a write signal that is derived from said received signal, and from which said received signal is read out in accordance with a locally generated read signal, and
  a justification decision circuit receiving a dynamically randomly varying threshold and a phase difference between said write signal and said read signal for regulating said reading out of said received signal from said buffer depending on instances in which said phase difference exceeds said dynamically randomly varying threshold, and a multiplexer for multiplexing each received signal read out of said buffer into a respective time slot of said higher rate signal.

20. The communication system of claim 19 further comprising:

a demultiplexer for demultiplexing each multiplexed signal from said higher rate signal, and, for each demultiplexed signal:
  a buffer, in which said demultiplexed signal is written in accordance with a second write signal that is derived from said higher rate signal, and from which said demultiplexed signal is read out in accordance with a second locally generated read signal, and
  a phase-locked loop receiving said second write signal and generating said second read signal therefrom.

* * * * *